(12) United States Patent
Lanjewar et al.

(10) Patent No.: US 11,349,840 B1
(45) Date of Patent: May 31, 2022

(54) HEURISTIC BASED AUTHENTICATION PROTOCOL FOR STATELESS PROTOCOL

(71) Applicant: Seagate Technology LLC, Fremont, CA (US)

(72) Inventors: Ujjwal Lanjewar, Pune (IN); Nilesh Govande, Pune (IN); Basavaraj Kirunge, Pune (IN)

(73) Assignee: SEAGATE TECHNOLOGY LLC, Fremont, CA (US)

( * ) Notice: Subject to any disclaimer, the term of this patent is extended or adjusted under 35 U.S.C. 154(b) by 0 days.

(21) Appl. No.: 17/091,754

(22) Filed: Nov. 6, 2020

(51) Int. Cl.
*H04L 9/40* (2022.01)

(52) U.S. Cl.
CPC .................... *H04L 63/10* (2013.01)

(58) Field of Classification Search
CPC ....................................................... H04L 63/10
See application file for complete search history.

(56) References Cited

U.S. PATENT DOCUMENTS

| | | | |
|---|---|---|---|
| 8,856,894 B1 | 10/2014 | Dean et al. | |
| 9,009,798 B2 | 4/2015 | Bakshi et al. | |
| 9,055,093 B2 | 6/2015 | Borders | |
| 9,160,730 B2 * | 10/2015 | Sheller | H04L 63/0861 |
| 9,325,588 B2 | 4/2016 | Lancaster et al. | |
| 9,391,968 B2 * | 7/2016 | Novack | H04L 63/08 |
| 9,967,250 B2 * | 5/2018 | Johansson | H04L 63/083 |
| 10,268,829 B2 | 4/2019 | Roets et al. | |
| 10,574,692 B2 | 2/2020 | Drake | |
| 10,735,414 B1 | 8/2020 | Ketharaju et al. | |
| 2015/0350249 A1 * | 12/2015 | Reno | H04L 63/1433 726/1 |
| 2017/0104722 A1 * | 4/2017 | Parla | H04L 63/0281 |

OTHER PUBLICATIONS

Extended Search Report completed by European Patent Office on Feb. 8, 2022 for European application 21202304.8.

* cited by examiner

*Primary Examiner* — David R Lazaro
(74) *Attorney, Agent, or Firm* — Holzer Patel Drennan

(57) ABSTRACT

Heuristic based approach to authentication of requests in a stateless protocol environment. Heuristics may be applied to a request to calculate a trust level for the request. The trust level for a request may at least in part be based on request parameters for the request and one or more previously received requests in a user context profile. Thus, historical request metadata may be used in calculating a trust value of a received request. If the trust value for a request exceeds a trust threshold, the request may be authenticated without forwarding the request to an authentication server. Thus, for requests in which the trust value exceeds the trust threshold, system performance may be improved by not requiring computational overhead and/or network bandwidth to be used in authentication. In this regard, the format of the request may still comport with the stateless protocol, but authentication may be made more efficient.

16 Claims, 5 Drawing Sheets

HEURISTIC BASED AUTHENTICATION PROTOCOL FOR STATELESS PROTOCOL

SUMMARY

The present disclosure relates to use of a heuristic based authentication protocol in a stateless protocol environment. The heuristic based authentication protocol described herein may facilitate improved system performance by allowing certain requests to the system that are determined to satisfy a level of trustworthiness to be authenticated by the system (e.g., locally at the system) without requiring the request to be forwarded to an authentication server. The trustworthiness of a request may be determined using a trust function to produce a trust value. If the trust value exceeds a trust threshold, requests may be authenticated without the request to be forwarded to an authentication server. The trust value for a request may be determined by application of a trust function to request parameters (e.g., a user, client, resource, and operation) of the request in view of request metadata that may include how the current request relates to previously received requests that are commonly associated with a user context or request profile for a user context.

Specifically, the heuristic based authentication protocol may include receiving, at a resource server from a client, a request for access to a resource hosted in a stateless protocol environment. The request may include one or more request parameters provided according to a stateless protocol for requesting access to the resource in the stateless protocol environment. The approach may also include calculating a trust level for the request by application of a trust function that is at least in part based on request metadata regarding the request and comparing the trust level to a trust threshold. The approach includes sending the request to an authentication server when the trust level equals or is below the trust threshold. The authentication server may attempt to authenticate the request using the one or more request parameters in relation to a resource access policy for the resource according to the stateless protocol. In contrast, when the trust level exceeds the trust threshold, the protocol grants access to the resource at the resource server without sending the request to the authentication server.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Other implementations are also described and recited herein.

BRIEF DESCRIPTIONS OF THE DRAWINGS

DETAILED DESCRIPTIONS

Figure 1:
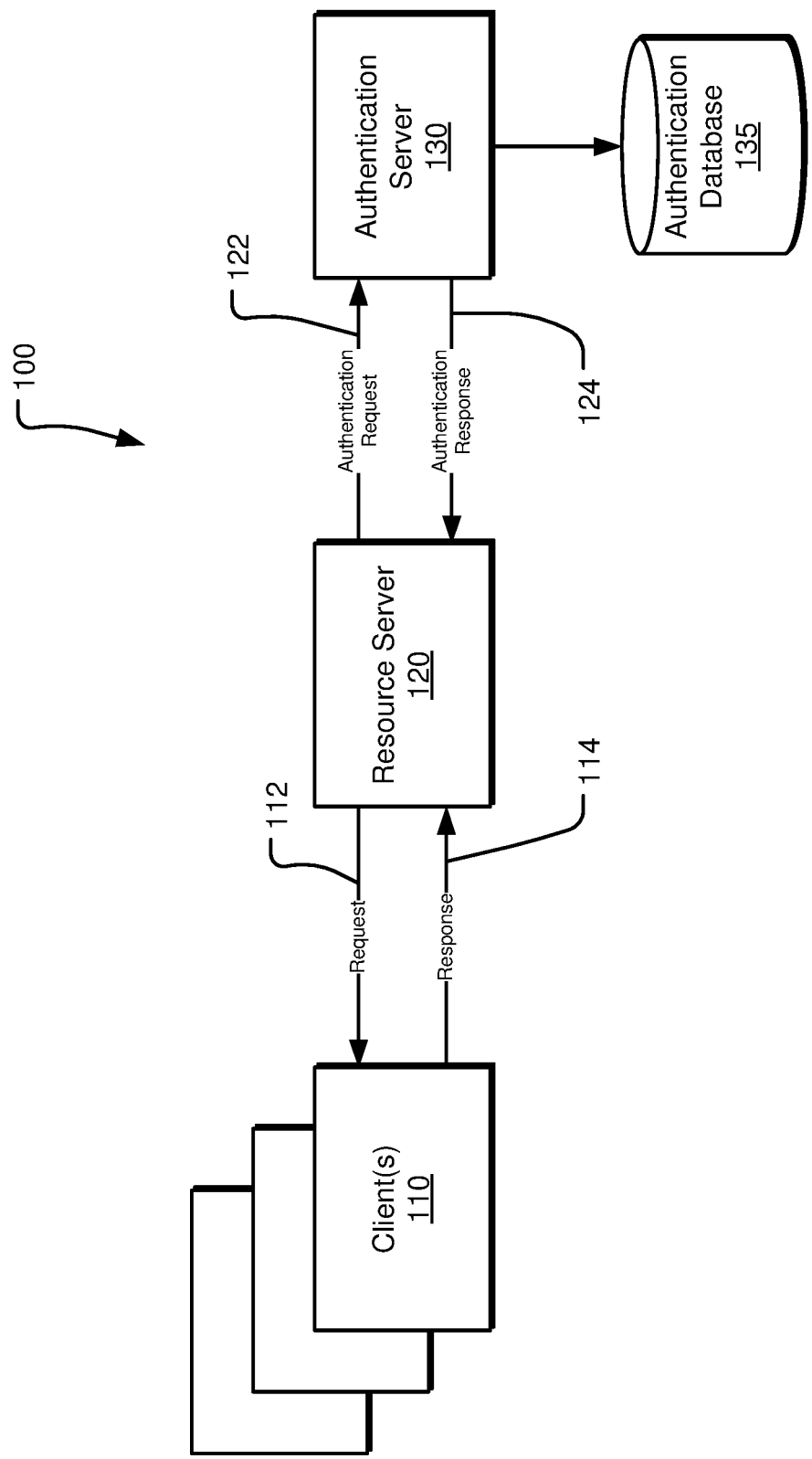
FIG. 1 illustrates an example of a prior art stateless protocol environment for a resource server.

While the invention is susceptible to various modifications and alternative forms, specific embodiments thereof have been shown by way of example in the drawings and are herein described in detail. It should be understood, however, that it is not intended to limit the invention to the particular form disclosed, but rather, the invention is to cover all modifications, equivalents, and alternatives falling within the scope of the invention as defined by the claims.

Network protocols may be categorized as either stateful protocols or stateless protocols. Regardless of the protocol, security is an important consideration that is required to authenticate requests received from clients randomly at a server to prevent unauthorized access to resources. For security in stateful protocols, servers can issue a session token to a client that has an expiry time after authentication of a client. Client requests received while the session token is valid are allowed during a valid session. Use of session tokens in a stateful protocol avoids the need for authenticating a client repeatedly during the valid session as all requests during the valid session using the session token are acted upon. Stateful protocols may suffer from security vulnerabilities. For example, if a bad actor steals a valid token and reuses the stolen valid token to initiate a session, resources may be subject to unauthorized access by the bad actor.

In contrast to the stateful protocol, stateless protocols require every request received from a client to be authenticated. This scenario is illustrated in FIG. 1 in which a stateless protocol environment 100 according to a previously proposed stateless protocol is shown. A client 110 may issue a request 112 to a resource server 120 that hosts any one or more resources that the client 110 wishes to access to perform an operation. The request 112 is forwarded as a forwarded request 122 to an authentication server 130. The forwarded request 122 may also include policy information such as an access control list for the resource that the client 110 is seeking to access. The authentication server 130 may utilize information from an authentication database 135 in connection with the information in the forwarded request 122 to attempt to validate the request 122. If the authentication server 130 validates the request, an authentication response 124 may be provided to the resource server 120. The resource server 120 may then return a response 114 granting access to the client 110 according to the request 112. Alternatively, if the forwarded request 122 cannot be validated, the authentication server 130 may return an authentication response 124 indicating the request be denied. In turn, the authentication server 130 may deny the request 112 and send a response 114 indicating the denial of access to the resource to the client 110.

The approach to authentication in a stateless protocol environment noted above in which every request by a client is authenticated by an authentication server does provide security by authenticating each request. However, communicating the forwarded request, determining the authentication decision, and returning the results from the authentication server for each and every request creates increased bandwidth and computational overhead that results in system latency and performance degradation with every request processed by the authentication server. Moreover, as the authentication server and authentication database may be separately provided components of a system that interface by way of network communications, any disruption in network availability may result in requests not being processed, thus potentially resulting in system outages.

Accordingly, while improvements on system performance in a stateless protocol environment would be advantageous, any modifications to such systems must be provided within certain bounds. For example, many modern web services and systems utilize stateless protocols such that the architecture of such systems is based on stateless protocols. In turn, changing authentication approaches (e.g., between a stateful to a stateless protocol or to a stateless protocol that requires modified request formatting) would likewise change the manner in which clients issue requests to such services, causing widespread client changes for all users of such systems. In this regard, any improvement to authentication for a protocol preferably would leave unaffected the request formatting required by clients seeking access to resources in the stateless protocol to avoid clients having to alter systems and processes to accommodate a changed request format.

It has also been proposed to use different authentication tiers based on the nature of the operation requested by a client for authentication in a stateless protocol. For example, simple authentication may be provided for basic access requests (e.g., as defined by system administrators) and higher-level authentication may be conducted for high risk operations. This approach does not provide granularity in relation to simplified authentication, but rather relies on rote application of authentication rules to the requests. In turn, the performance increases that such an approach may realize are limited and security is inherently degraded for some operations.

Accordingly, the present disclosure provides an approach to authentication in a stateless protocol environment that utilizes a heuristic based approach. Clients may issue requests for which authentication can be optimized by using an historically derived user context profile (also referred to herein simply as a "user context") with an associated calculated trust level. That is, the system may determine a plurality of requests to be related in some fashion to associate the requests with a common user context profile. The user context profile may be based on information or request parameters such as requests that originate from a given client, include a given user's credentials, identify a given resource, and/or perform a given operation. A trust function may be applied to a request to evaluate the request parameters for the request in view of request metadata. The request metadata may include historical request information for the user context profile, access control lists for resources in the system, temporal information regarding the request or historic requests, or other information. Based on the trust level determined for a user context relative to a trust threshold, a client request may be allowed without authentication of every client request by the authentication server. In fact, requests may not be communicated to the authentication server if the trust level exceeds a trust threshold, thus provided conserved network bandwidth and computation overhead in the system.

In the heuristic based approach described herein, reference is made to a user context profile. A user context profile is intended to indicate a plurality of requests that may be related in some way so that the authenticity of the requests may be related. For instance, a user may wish to upload a large file or a series of large files, such that the operation may be segmented into, for example, 100 different requests that are all related as being issued from the same client, by the same user, directed to the same storage object, and including the same operation. In this scenario, the requests may all be determined to belong to a given user context profile. In turn, requests associated with the user context profile may be evaluated in relation to previously received requests in the user context profile when calculating the trust value using the trust function. For example, while initial requests may not result in a trust level for the user context exceeding the trust threshold (e.g., such that those requests are forwarded to an authentication server for traditional authentication), when the trust level for the user context exceeds the trust threshold, others of the requests may be granted without forwarding the requests to an authentication server.

A determination of whether a received request is associated with a user context profile or represents a new user context profile may be determined based on one or more characteristics or request parameters such as, for example, a client, a user, a resource, or an operation. In this regard, the request parameters may generally comprise a tuple including an originating client identifier or port identifier, a user identifier based on user credentials provided with the request, a resource identified in the request, and/or an operation identified in the request. The request metadata may include any request parameter, a combination of request parameters, current and historic request parameters associated with the user context in which the request is received, temporal information regarding the request and historic requests, and/or access control lists for one or more resources in the system.

For instance, for a given client identifier, a user context may be established associated with requests received from the client associated with the client identifier. A trust level may be calculated based on request metadata regarding requests received in the user context (e.g., including historical request metadata). The trust level may be increased in the event that a request, in view of the historical request metadata for the user context, conforms to a trustworthiness indication. In contrast, the trust level may be decreased in the event that a request, in view of the historical request metadata for the user context, indicates activity that conforms to an indication of untrustworthiness. Such indications of trustworthiness and untrustworthiness may be characterized by one or more heuristic rules applied to the requests in a given user context to increase or decrease the trust level for the user context as will be described in greater detail below. When the trust level for a user context is above a trust threshold, requests may be exempted from authentication by an authentication server and the request may be granted without forwarding any information regarding the request to the authentication server (e.g., using a bypass authentication module at a resource server without intervention by the authentication server). However, if a trust level for the user context falls below a trust threshold, a request may be authenticated by sending the request to an authentication server for authentication by the authentication server. This may result from a reset of the trust level due to a trigger or may be in relation to decay of the trust level to a level below the trust threshold based on the indication of untrustworthiness of one or more requests.

Of note, while the use of a trust level in relation to a trust threshold allows for more efficient authentication of at least some request, the format of the request may still comport with the stateless protocol (e.g., include one or more request parameters provided according to a stateless protocol for requesting access to the resource in the stateless protocol environment). Thus, use of the heuristic based approach may have no impact on the nature in which requests are formatted by a client. As such, the heuristic based authentication described herein is transparent to the client but can be used to make authentication more efficient. This efficiency may be achieved without clients in a system (which may or may not be controlled by the administrator of the system) to continue to function without interruption or change relative to the stateless protocol executed. As such, the request may comprise one or more request parameters provided according to a stateless protocol for requesting access to the resource in the stateless protocol environment. Thus, in the event that the request is not capable of being authorized based on the trust level calculated at a bypass authentication module locally at a resource server, the request may still be processed by the authentication server using existing authentication approaches applied in relation to the stateless protocol for requesting access to the resource in the stateless protocol environment.

The trust threshold may be a user configurable value. In this regard, increasing or decreasing the trust threshold may allow a system administrator to tune the system between security and performance. For instance, for lower trust threshold values, fewer requests may be forwarded to the authentication server, thus improving system performance by decreasing computational overhead and network bandwidth usage. In contrast, increasing the trust threshold may provide more system security by providing more scrutiny and higher indications of trustworthiness to requests prior to bypassing the authentication server.

An initial trust level for a user context may be established at a zero value. In this regard, an initial request (e.g., and potentially some number of subsequent requests) may be authenticated using an authentication server. Even initial requests in a user context that are received when the trust level is below the trust threshold may contribute to the calculation of the trust value for subsequent requests. For instance, upon successful authentication of a request by the authentication server, the trust level may be increased to a level that exceeds the trust threshold such that subsequent requests that do not degrade the trust level below the threshold may be granted by the bypass authentication module without forwarding the requests to an authentication server. That is, once the trust level for the user context has been increased to surpass the trust threshold, authentication may be optimized by forgoing use of the authentication server and authentication of requests by a bypass authentication module at the resource server. That is, the trust level for a user context may be built (by a factor) based on the repeated requests of a user context. If the nature of requests (e.g., request parameters) in a user context, such as the duration of the request, an object ID requested, etc., changes then the trust level may drop by a factor.

Any number of rules or other parameter may be established that effect the trust level for a given user context. For instance, for every successful request that is authorized (e.g., by the authentication server or by the bypass authentication module), the trust level may be increased. In contrast, an unauthorized request may result in the trust value being decreased. Moreover, the amount or magnitude by which the trust level is decreased for a failed authentication may be greater than the amount or magnitude by which the trust level is increased by a successful authentication.

Moreover, the similarity of the request parameters to the historic request metadata may affect the trust value. For instance, if a client sends 10 prior requests from a user to perform the same operation on the same object that are all authenticated, a subsequent request may have a relatively high trust value. However, if a subsequent request is different such as performing a different operation or targeting a different object, the trust value for that request may be relatively lower than the request with similar request parameters to the request parameters of previous authenticated requests.

Also, the trust level may be at least in part based on a periodic or temporal element. As an example, the trust level may be decreased by a predetermined amount over every certain period of time (e.g., the trust level may be decreased by 1 every 1 hour). In other words, the trust value may decay with elapsed time.

Further still, certain events may cause the trust level to be reset to zero. Examples of such events may include a user credential change. That is, if a user from which the requests are initiated is changed, the trust level may be reset to zero. Moreover, a new user context may be established for the new user credentials.

Also, within a given user context, the trust level may also be reset to zero. One such example may include a system restart. Also, if an object access control list changes, the trust level for a user context may be reset to zero. Also, after certain period of time (a reset time), the trust level for a user context may be reset to zero (e.g., after 1 hour, after 2 hours, after 4 hours, after 8 hours, after 12 hours, or after 24 hours). This reset to zero after a certain period of time may occur even if the decay of the periodic or temporal decrease has not yet reached zero at the expiration of the reset time. That is, a hard reset after a given elapsed duration may occur regardless of whether the decay based on elapsed time results in the trust value being zero. Further still, the trust level may be reset to zero after a certain number of consecutive failed authentications. This may operate in concert with the decrease in trust value for individual authentication failures. However, the trust level may be reset to zero after a certain number of failed authentications even if the individual reduction by each failed request has not yet caused the trust level to reach zero.

The trust value may also comprise a weighted value of individual trust parameters. For instance, trust parameters may correspond to one or more of the request parameters. In this regard, individual trust parameters may be related to a trust level for a prior number of clients, a trust level for a prior number of users, a trust level for a prior number of resources, and/or a trust level for a prior number of operations. Each trust parameter may be weighted with a corresponding weight value. As such, each trust parameter may be individually weighted with different weight values to arrive at a composite weighted trust value based on the individual weighted trust levels of each given trust parameter value.

In still another context, some requests processed by a resource server may originate internally from the resource server. For example, the system may require maintenance from time to time and requests associated with such maintenance may be generated and processed internally to the resource server (e.g., by a system administrator or the like). The trust level for these internally generated requests may be defined in a manner that these requests are bypassed or granted access without requiring authentication by the authentication server. For example, the trust function may have logic that may identify such internally generated request to calculate a trust value that exceeds the trust threshold for any such request.

Figure 2:
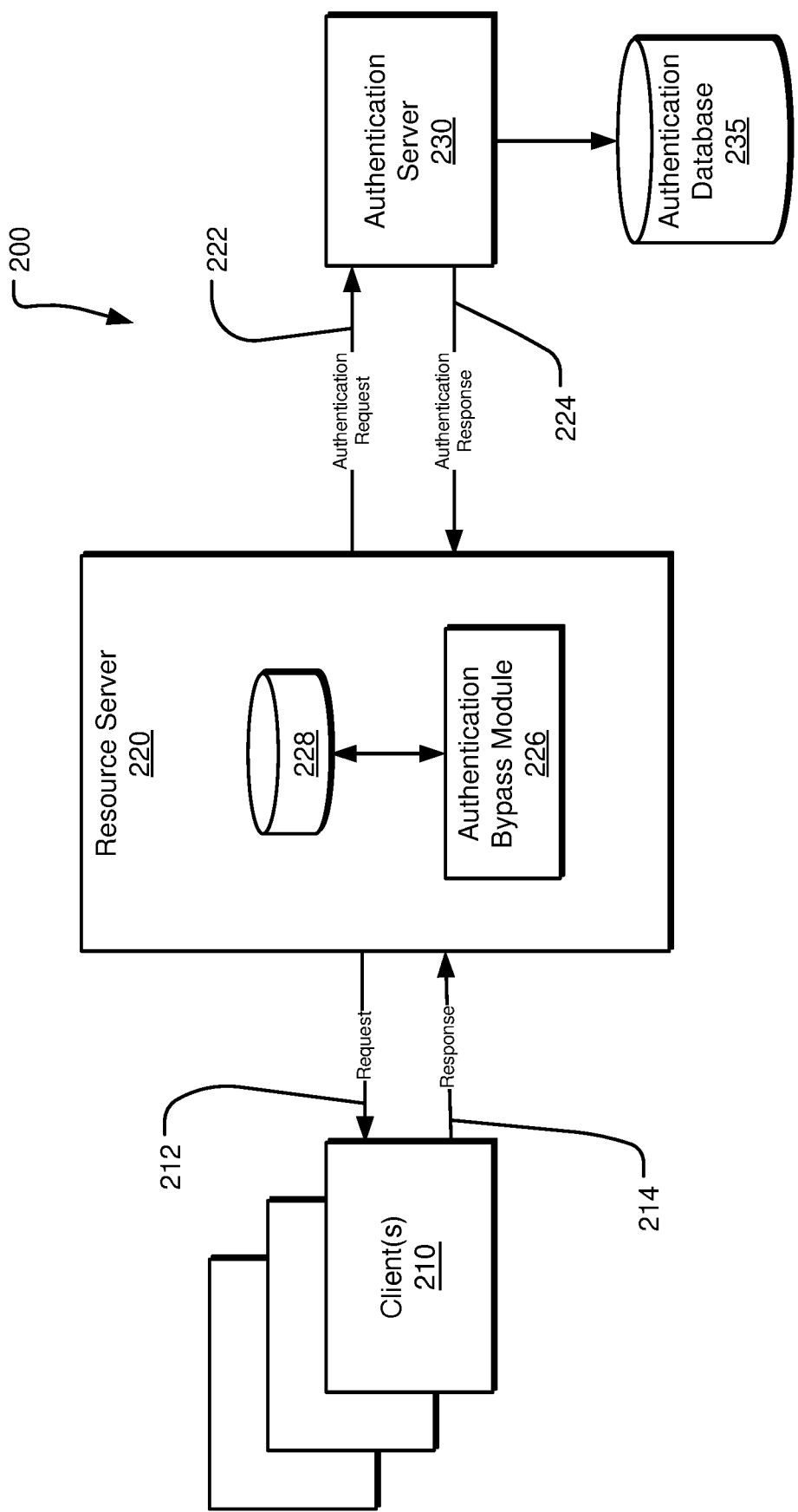
FIG. 2 illustrates an example of a stateless protocol environment according to the present disclosure that includes an authentication bypass module for application of a heuristic based authentication protocol.

FIG. 2 illustrates a stateless protocol environment 200 that may employ a heuristic based approach to authentication as described above. Like the environment 100 depicted in FIG. 1, a client 210 may send a request 212 that is received at a resource server 220. The resource server 220 may facilitate access to one or more resources. The resources may be any type of resource including services and/or data. In one example, the resource may comprise a web object such as a storage object. In this regard, the request 212 may comprise a request to perform an operation on a storage object. The operation may include a write command, a read command, a move command, a copy command, or any other appropriate manipulation of the object that is the subject of the request. The resource server 220 may include an authentication bypass module 226 that may perform the heuristic based approach to authentication. That is, the authentication bypass module 226 may be in operative communication with a trust database 228, which may include instructions and/or rules for execution in relation to the heuristic based authentication such as those governing the effect of certain conditions' effect on the trust value as described above. The authentication bypass module 226 may maintain a trust threshold that may be configurable. The authentication bypass module may also comprise a trust function that is applied to request metadata (e.g., based on current and/or historic request parameters) to calculate a trust value for a request. The resource server 220 may also be in operative communication with an authentication server 230 that is in operative communication with an authentication database 235.

As will be described in greater detail below, the authentication bypass module 226 may receive the request 212 from the client 210 to process the request to determine whether to send the request 212 as a forwarded request 222 to the authentication server 230 based on whether a trust level for a user context in which the request 212 is received exceeds a trust threshold.

Figure 3:
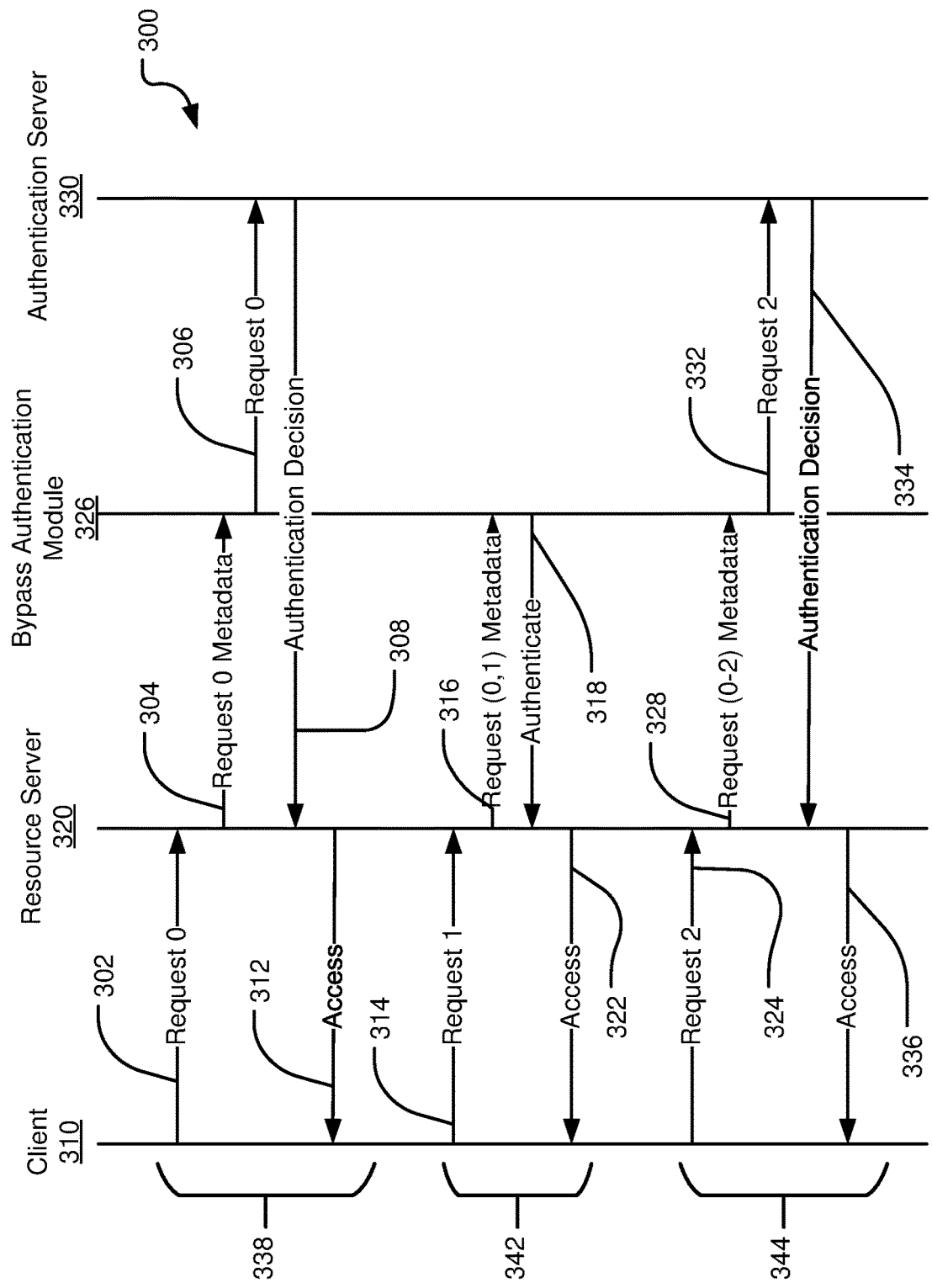
FIG. 3 illustrates example communications within a stateless protocol environment that utilizes a heuristic based authentication protocol.

FIG. 3 illustrates communications within a stateless protocol environment that includes heuristic based approach to authentication. FIG. 3 includes a representation of each of a client 310, a resource server 320, a bypass authentication module 326, and an authentication server 330. FIG. 3 also includes arrows representing communications between the respective entities in the environment. Generally, FIG. 3 includes three separate transactions in a user context including a first request (Request 0) in the sequence of 338, a second request (Request 1) in the sequence of 342, and a third request (Request 2) in the sequence of 344.

Turning to the first request 338, a request 302 may be sent from the client 310 to the resource server 320. The resource server 320 may send the request metadata 304 to the bypass authentication module 326. The bypass authentication module 326 may use the request metadata 304 to calculate a trust value for the user context. In the depicted example, the request 302 may be an initial request such that there is no historic request metadata associated with the user context. As such, the initial trust value for the user context may be zero. Based on this, the trust threshold may not be exceeded such that the bypass authentication module 326 forwards the request 306 to the authentication server 330. In turn, the authentication server 330 may return an authentication decision 308 to the resource server 320 after application of a traditional authentication on the request 306. In response to the authentication decision 308, an access response 312 may be provided to the client 310 either providing access to the requested resource or denying the request 302.

In a subsequent sequence 342, a request 314 may be sent from the client 310 to the resource server 320. The request 314 may be associated with the same user context as the request 302. In this regard, request metadata from the first request 302 and the second request 314 may be provided to the bypass authentication module 316. The sequence 342 represents an example where the trust level for the user context exceeds a trust threshold. In this regard, the bypass authentication module 326 may return an authentication message 318 to the resource server 320. In turn, the resource server 320 provides access 322 to the requested resource. As can be appreciated, the access 322 is provided without sending any information to the authentication server 330.

In a further sequence 344, a request 324 may be sent from the client 310 to the resource server 320. In turn, the request metadata 328 for the request 324, the request 314, and the request 302 to the bypass authentication module 326. In this sequence 344, a condition may occur that results in the trust level for the user context dropping below the trust threshold. As such, the bypass authentication module 326 may forward the request 332 to the authentication server 330. In turn, an authentication decision 334 may be returned to the resource server 320. The resource server 320 may then grant access or deny access in an access decision 336 communicated to the client 310.

Figure 4:
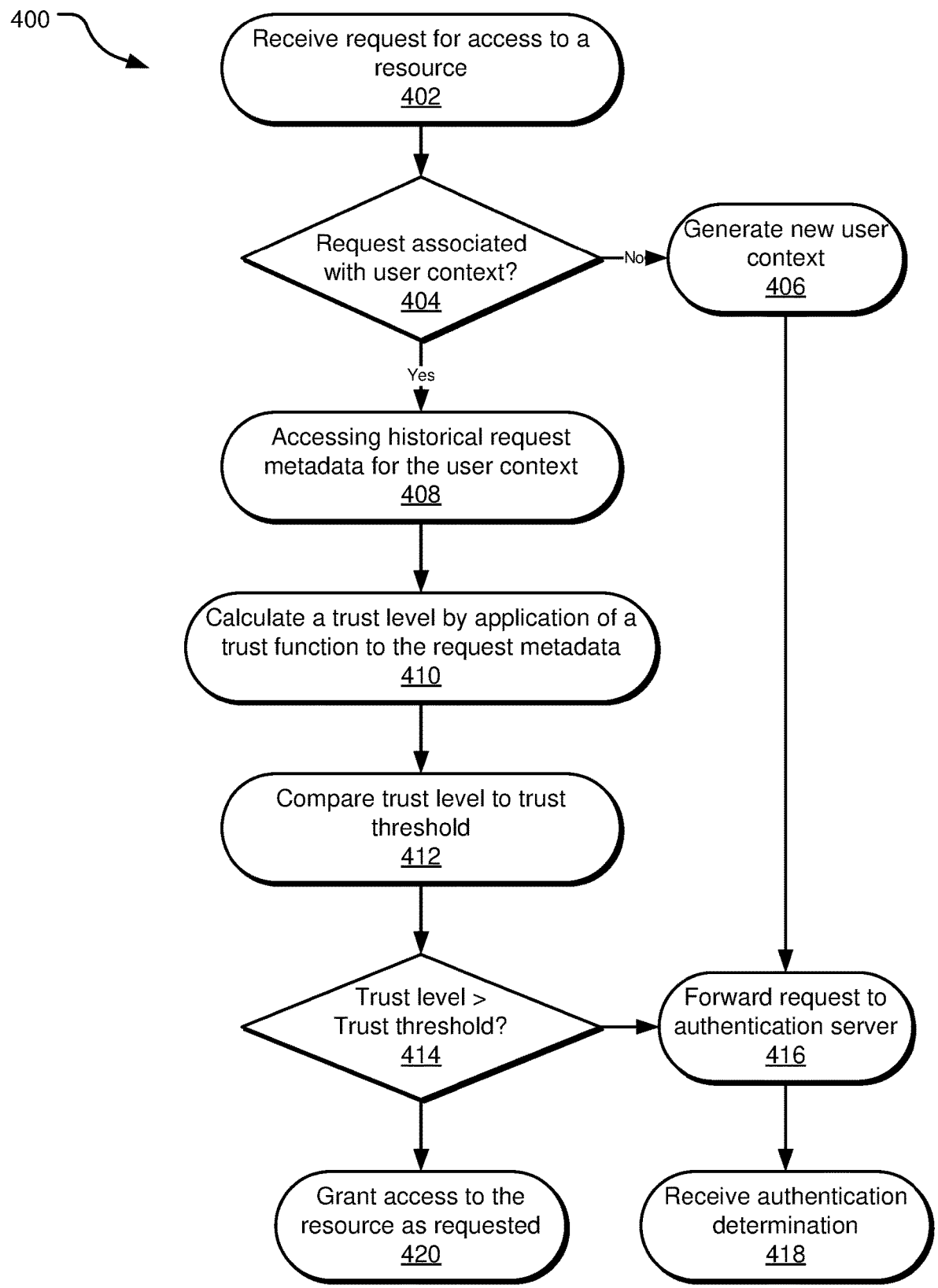
FIG. 4 illustrates example operations of a method of a heuristic based authentication protocol.

FIG. 4 illustrates example operations 400 for performing a heuristic based authentication. The operations 400 may include a receiving operation 402 in which a request for access to a resource is received at a resource server from a client. A determining operation 404 may determine if the request received in the receiving operation 402 is associated with an existing user context. If it is determined that no user context exists for the request, the trust level may be set to zero and a generating operation 406 may generate a new user context. In turn, as the trust level is zero, the operations 400 may include forwarding the request to an authentication server in a forwarding operation 416.

However, if the request is associated with a user context, the operations 400 may include an accessing operation 408 in which historical request metadata for the user context is accessed. In addition, in a calculating operation 410, a trust level may be calculated in view of a trust function. The trust function may include inputs regarding the request metadata for the received request and historical request metadata from the user context. That is, the trust function may generate a trust value for the request based on the perceived trustworthiness of the request in view of the historic requests of the user context.

The operations 400 may also include a comparing operation 412 in which the trust level calculated in the calculating operation 410 is compared to a trust threshold. A determining operation 414 may determine if the trust level exceeds the trust threshold. If it is determined that the trust level does not exceed the trust threshold in the determining operation 414, the forwarding operation 416 may forward the request to an authentication server. Subsequent to the forwarding operation 416, which may correspond to a traditional stateless protocol authentication process, an authentication determination may be received in a receiving operation 418. In turn, a resource server may grant or deny access to the requested resource based on the received authentication determination.

If, however, the trust level exceeds the trust threshold, a granting operation 420 may grant access to the request without forwarding the request to the authentication server. For instance, the granting operation 420 may be performed by a bypass authentication module at the resource server such that the granting operation 420 may be performed locally at the resource server without involvement of the authentication server. This may provide a streamlined authentication that may reduce latency in processing the request. Furthermore, this streamlined authentication may conserve computational resources as compared to forwarding the request to an authentication server for traditional processing of the request at the authentication server.

Figure 5:
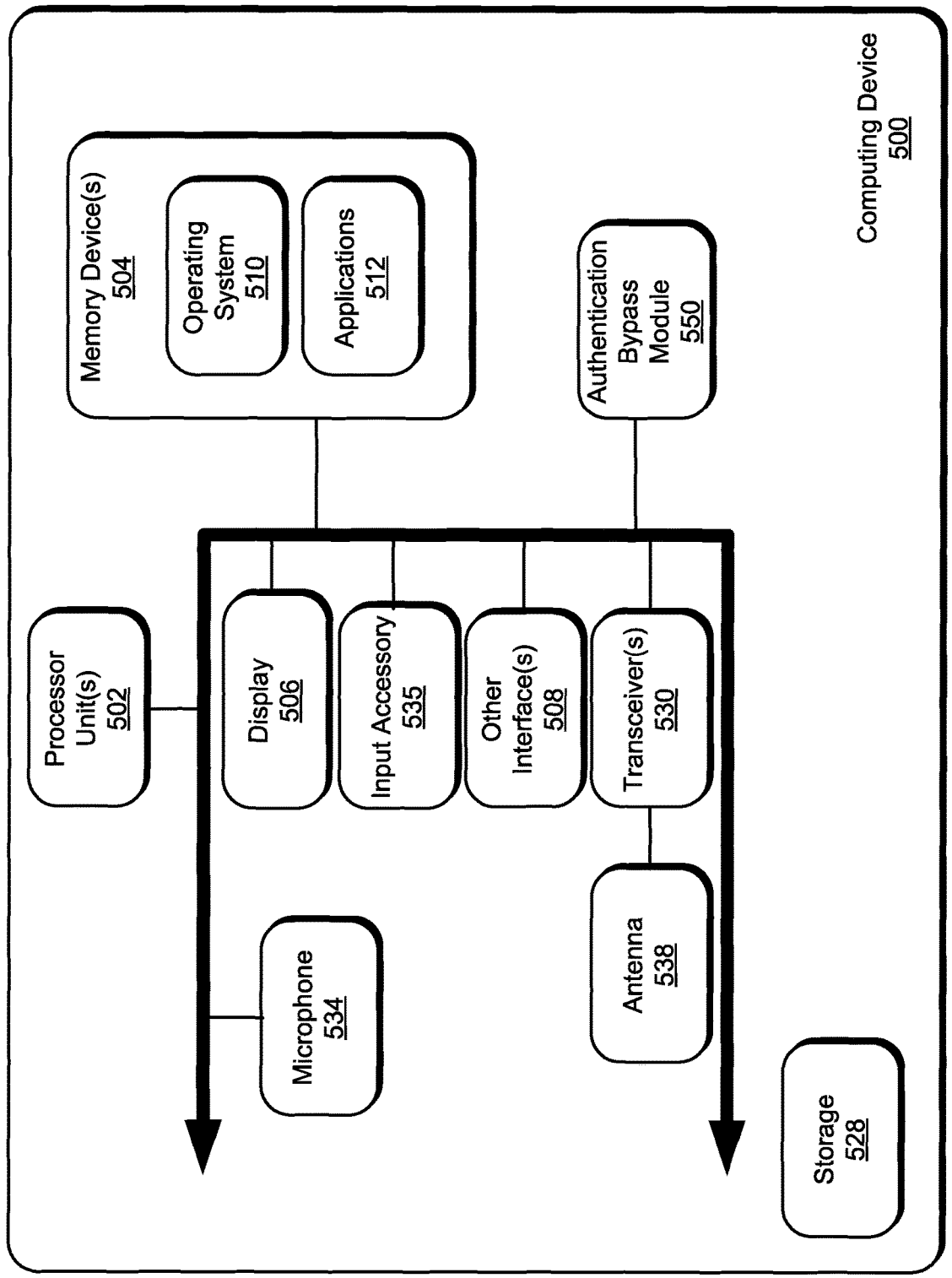
FIG. 5 illustrates an example computing device capable of executing aspects of the present disclosure.

FIG. 5 illustrates an example schematic of a computing device 500 suitable for implementing aspects of the disclosed technology including a bypass authentication module as described above. The computing device 500 includes one or more processor unit(s) 502, memory 504, a display 506, and other interfaces 508 (e.g., buttons). The memory 504 generally includes both volatile memory (e.g., RAM) and non-volatile memory (e.g., flash memory). An operating system 510, such as the Microsoft Windows® operating system, the Apple macOS operating system, or the Linux operating system, resides in the memory 504 and is executed by the processor unit(s) 502, although it should be understood that other operating systems may be employed.

One or more applications 512 are loaded in the memory 504 and executed on the operating system 510 by the processor unit(s) 502. Applications 512 may receive input from various input local devices such as a microphone 534, input accessory 535 (e.g., keypad, mouse, stylus, touchpad, joystick, instrument mounted input, or the like). Additionally, the applications 512 may receive input from one or more remote devices such as remotely-located smart devices by communicating with such devices over a wired or wireless network using more communication transceivers 530 and an antenna 538 to provide network connectivity (e.g., a mobile phone network, Wi-Fi®, Bluetooth®). The computing device 500 may also include various other components, such as a positioning system (e.g., a global positioning satellite transceiver), one or more accelerometers, one or more cameras, an audio interface (e.g., the microphone 534, an audio amplifier and speaker and/or audio jack), and storage devices 528. Other configurations may also be employed.

The computing device 500 further includes a power supply 516, which is powered by one or more batteries or other power sources and which provides power to other components of the computing device 500. The power supply 516 may also be connected to an external power source (not shown) that overrides or recharges the built-in batteries or other power sources.

In an example implementation, the computing device 500 comprises hardware and/or software embodied by instructions stored in the memory 504 and/or the storage devices 528 and processed by the processor unit(s) 502. The memory 504 may be the memory of a host device or of an accessory that couples to the host. Additionally or alternatively, the computing device 500 may comprise one or more field programmable gate arrays (FGPAs), application specific integrated circuits (ASIC), or other hardware/software/firmware capable of providing the functionality described herein.

The computing device 500 may include a variety of tangible processor-readable storage media and intangible processor-readable communication signals. Tangible processor-readable storage can be embodied by any available media that can be accessed by the computing device 500 and includes both volatile and nonvolatile storage media, removable and non-removable storage media. Tangible processor-readable storage media excludes intangible communications signals and includes volatile and nonvolatile, removable, and non-removable storage media implemented in any method or technology for storage of information such as processor-readable instructions, data structures, program modules or other data. Tangible processor-readable storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other tangible medium which can be used to store the desired information and which can be accessed by the computing device 500. In contrast to tangible processor-readable storage media, intangible processor-readable communication signals may embody processor-readable instructions, data structures, program modules or other data resident in a modulated data signal, such as a carrier wave or other signal transport mechanism. The term "modulated data signal" means an intangible communications signal that has one or more of its characteristics set or changed in such a manner as to encode information in the signal. By way of example, and not limitation, intangible communication signals include signals traveling through wired media such as a wired network or direct-wired connection, and wireless media such as acoustic, RF, infrared, and other wireless media.

Some implementations may comprise an article of manufacture. An article of manufacture may comprise a tangible storage medium to store logic. Examples of a storage medium may include one or more types of processor-readable storage media capable of storing electronic data, including volatile memory or non-volatile memory, removable or non-removable memory, erasable or non-erasable memory, writeable or re-writeable memory, and so forth. Examples of the logic may include various software elements, such as software components, programs, applications, computer programs, application programs, system programs, machine programs, operating system software, middleware, firmware, software modules, routines, subroutines, operation segments, methods, procedures, software interfaces, application program interfaces (API), instruction sets, computing code, computer code, code segments, computer code segments, words, values, symbols, or any combination thereof. In one implementation, for example, an article of manufacture may store executable computer program instructions that, when executed by a computer, cause the computer to perform methods and/or operations in accordance with the described implementations. The executable computer program instructions may include any suitable type of code, such as source code, compiled code, interpreted code, executable code, static code, dynamic code, and the like. The executable computer program instructions may be implemented according to a predefined computer language, manner, or syntax, for instructing a computer to perform a certain operation segment. The instructions may be implemented using any suitable high-level, low-level, object-oriented, visual, compiled and/or interpreted programming language.

One aspect of the present disclosure includes a method for authenticating a request to access a resource in a stateless protocol environment. The method includes receiving, at a resource server from a client, a request for access to a resource hosted in a stateless protocol environment. The request includes one or more request parameters (e.g., user, client, resource, operation) provided according to a stateless protocol for requesting access to the resource in the stateless protocol environment. The method also includes calculating a trust level for the request by application of a trust function that is at least in part based on request metadata regarding the request. The method includes comparing the trust level to a trust threshold. In response, the method may include sending the request to an authentication server when the trust level equals or is below the trust threshold. In this case, the authentication server attempts to authenticate the request using the one or more request parameters in relation to a resource access policy for the resource according to the stateless protocol. Alternatively, the method may include granting access to the resource at the resource server without sending the request to the authentication server when the trust level exceeds the trust threshold.

Implementations may include one or more of the following features. For example, the trust level may be associated with a user context that is at least in part determined based on one of the client, a user, the resource, or an operation to be performed on the resource. The trust level for the request may be at least in part based on the request metadata for a current request and historical request metadata for one or more prior requests associated with the user context.

In an example, the calculating may include resetting the trust level to zero in response to at least one of a user credential change, a system restart, a change in a resource access control list, a predetermined reset duration expiring, or a predetermined number of requests having been processed.

Furthermore, in an example, a change in the request parameters relative to the historical request metadata may results in a decrease of the trust value. The trust level may be increased in response to a successful request and the trust level may be decreased in response to an unauthenticated request. A decrease for an unauthenticated request may have a greater magnitude than an increase for a successful request.

In an example, the request metadata comprises at least one time-based parameter, wherein the time-based parameter decays the trust level at a predetermined rate.

In an example, a plurality of portions of trust metadata may include trust parameters. The trust value may be at least in part based on weighted values of the trust parameters.

In an example, the request metadata may include a client from which the request is received, a user, a resource to which access is requested, and an operation to be performed on the resource to which access is requested.

Another general aspect of the present disclosure includes a method for authenticating requests to access one or more resources in a stateless protocol environment. The method includes receiving, at a resource server from a client, a first request for access to a resource hosted in a stateless protocol environment. The first request includes one or more first request parameters provided according to a stateless protocol for requesting access to a resource in the stateless protocol environment. The method includes providing the first request to an authentication server for authentication of the first request at the authentication server according to a resource access policy for the resource. In turn, the method includes receiving a second request. The second request comprises one or more second request parameters provided according to the stateless protocol for requesting access to the resource. The method includes calculating a trust level for the second request by application of a trust function that is at least in part based first request metadata regarding the first request and second request metadata regarding the second request and comparing the trust level for the second request to a trust threshold. In this regard, the method includes sending the second request to the authentication server for authentication of the second request at the authentication server according to the resource access policy for the resource when the trust level does not exceed the trust threshold. Alternatively, the method includes granting access to the resource at the resource server without sending the second request to the authentication server when the trust level exceeds the trust threshold.

Implementations may include one or more of the following features. For example, the method may include calculating a trust level for the first request based on first request metadata regarding the first request and comparing the trust level for the first request to the trust threshold. The providing the first request to the authentication server may be in response to the first trust level not exceeding the trust threshold.

In an example, the updating may include resetting the trust level to zero in response to at least one of a user credential change, a system restart, a change in a resource access control list, after a predetermined reset duration, or after a predetermined number of requests. In at least some examples, the trust function may increase the trust value in response to prior successful requests and the trust function may decrease the trust level in response to prior unauthenticated request. A decrease for an unauthenticated request may have a greater magnitude than an increase for a successful request.

In an example, a change in the request parameters relative to prior request metadata results in a decrease of the trust value. The first request may be an initial request in a user context and the trust value for the initial request is zero.

In an example, the user context may be at least in part determined based on one of the client, a user, the resource, or an operation to be performed on the resource. The request metadata may include a tuple comprising the client from which the request originates, a user signing the request, the resource for which access is requested, and an operation requested to be performed relative to the resource.

In an example, a format of the first request parameters may be the same as the format of the second request parameters, but the respective values for the first request parameters and the second request parameters are different.

In an example, the request metadata may include at least one time-based parameter, wherein the time-based parameter decays the trust level at a predetermined rate.

Another general aspect of the present disclosure includes a system for authenticating requests to access one or more resources in a stateless protocol environment. The system includes a resource server operative to receive from a client a request for access to a resource hosted by the resource in a stateless protocol environment. The request includes one or more request parameters provided according to a stateless protocol for requesting access to the resource in the stateless protocol environment. The system also includes an authentication bypass module executed at the resource server. The authentication bypass module is operative to calculate a trust level for the request by application of a trust function that is at least in part based on request metadata regarding the request and compare the trust level to a trust threshold. The system also includes an authentication server that receives the request from the authentication bypass module when the trust level equals or is below the trust threshold. The authentication server attempts to authenticate the request using the one or more request parameters in relation to a resource access policy for the resource according to the stateless protocol. Furthermore, the authentication bypass module is operative to grant access to the resource at the resource server without sending the request to the authentication server when the trust level exceeds the trust threshold.

The implementations described herein are implemented as logical steps in one or more computer systems. The logical operations may be implemented (1) as a sequence of processor-implemented steps executing in one or more computer systems and (2) as interconnected machine or circuit modules within one or more computer systems. The implementation is a matter of choice, dependent on the performance requirements of the computer system being utilized. Accordingly, the logical operations making up the implementations described herein are referred to variously as operations, steps, objects, or modules. Furthermore, it should be understood that logical operations may be performed in any order, unless explicitly claimed otherwise or a specific order is inherently necessitated by the claim language.

While the invention has been illustrated and described in detail in the drawings and foregoing description, such illustration and description is to be considered as exemplary and not restrictive in character. For example, certain embodiments described hereinabove may be combinable with other described embodiments and/or arranged in other ways (e.g., process elements may be performed in other sequences). Accordingly, it should be understood that only the preferred embodiment and variants thereof have been shown and described and that all changes and modifications that come within the spirit of the invention are desired to be protected.

What is claimed is:

1. A method for authenticating a request to access a resource in a stateless protocol environment, comprising:
   receiving, at a resource server from a client, a request for access to a resource hosted in a stateless protocol environment, wherein the request comprises one or more request parameters provided according to a stateless protocol for requesting access to the resource in the stateless protocol environment;
   calculating a trust level for the request by application of a trust function that is at least in part based on request metadata regarding the request, wherein the trust level is associated with a user context that is at least in part determined based on one of the client, a user, the resource, or an operation to be performed on the resource and the trust level for the request is at least in part based on the request metadata for a current request and historical request metadata for one or more prior requests associated with the user context, and wherein the trust level is increased in response to a prior successful request and the trust level is decreased in response to a prior unauthenticated request, wherein a decrease for the prior unauthenticated request is a greater magnitude than an increase for the prior successful request;
   comparing the trust level to a trust threshold;
   sending the request to an authentication server when the trust level equals or is below the trust threshold, wherein the authentication server attempts to authenticate the request using the one or more request parameters in relation to a resource access policy for the resource according to the stateless protocol; and
   granting access to the resource at the resource server without sending the request to the authentication server when the trust level exceeds the trust threshold.

2. The method of claim 1, wherein the calculating comprises resetting the trust level to zero in response to at least one of a user credential change, a system restart, a change in a resource access control list, a predetermined reset duration expiring, or a predetermined number of requests having been processed.

3. The method of claim 1, wherein a change in the request parameters relative to the historical request metadata results in a decrease of the trust value.

4. The method of claim 1, wherein the request metadata comprises at least one time-based parameter, wherein the time-based parameter decays the trust level at a predetermined rate.

5. The method of claim 1, wherein a plurality of portions of trust metadata comprise trust parameters, and wherein the trust value is at least in part based on weighted values of the trust parameters.

6. The method of claim 1, wherein the request metadata comprises a client from which the request is received, a user, a resource to which access is requested, and an operation to be performed on the resource to which access is requested.

7. A method for authenticating requests to access one or more resources in a stateless protocol environment, comprising:
   receiving, at a resource server from a client, a first request for access to a resource hosted in a stateless protocol environment, wherein the first request comprises one or more first request parameters provided according to a stateless protocol for requesting access to a resource in the stateless protocol environment;
   providing the first request to an authentication server for authentication of the first request at the authentication server according to a resource access policy for the resource;
   receiving a second request, wherein the second request comprises one or more second request parameters provided according to the stateless protocol for requesting access to the resource;
   calculating a trust level for the second request by application of a trust function that is at least in part based on first request metadata regarding the first request and second request metadata regarding the second request, wherein the trust function increases the trust value in response to prior successful requests and the trust function decreases the trust level in response to prior unauthenticated request, wherein a decrease for the prior unauthenticated request is a greater magnitude than an increase for the prior successful request;
   comparing the trust level for the second request to a trust threshold; and
   sending the second request to the authentication server for authentication of the second request at the authentication server according to the resource access policy for the resource when the trust level does not exceed the trust threshold; and
   granting access to the resource at the resource server without sending the second request to the authentication server when the trust level exceeds the trust threshold.

8. The method of claim 7, further comprising:
   calculating a trust level for the first request based on first request metadata regarding the first request;
   comparing the trust level for the first request to the trust threshold; and
   wherein the providing the first request to the authentication server is in response to the first trust level not exceeding the trust threshold.

9. The method of claim 7, wherein the updating comprises resetting the trust level to zero in response to at least one of a user credential change, a system restart, a change in a resource access control list, after a predetermined reset duration, or after a predetermined number of requests.

10. The method of claim 7, wherein a change in the request parameters relative to prior request metadata results in a decrease of the trust value.

11. The method of claim 7, wherein the first request is an initial request in a user context and the trust value for the initial request is zero.

12. The method of claim 11, wherein the user context is at least in part determined based on one of the client, a user, the resource, or an operation to be performed on the resource.

13. The method of claim 7, wherein the request metadata comprises a tuple comprising the client from which the request originates, a user signing the request, the resource for which access is requested, and an operation requested to be performed relative to the resource.

14. The method of claim 13, wherein a format of the first request parameters are the same as the format of the second request parameters, but the respective values for the first request parameters and the second request parameters are different.

15. The method of claim 7, wherein the request metadata comprises at least one time-based parameter, wherein the time-based parameter decays the trust level at a predetermined rate.

16. A system for authenticating requests to access one or more resources in a stateless protocol environment, comprising:
- a resource server operative to receive from a client a request for access to a resource hosted by the resource in a stateless protocol environment, wherein the request comprises one or more request parameters provided according to a stateless protocol for requesting access to the resource in the stateless protocol environment;
- an authentication bypass module executed at the resource server operative to:
    - calculate a trust level for the request by application of a trust function that is at least in part based on request metadata regarding the request, wherein the trust level is increased in response to a prior successful request and the trust level is decreased in response to a prior unauthenticated request, wherein a decrease for the prior unauthenticated request is a greater magnitude than an increase for the prior successful request, and
    - compare the trust level to a trust threshold;
- an authentication server that receives the request from the authentication bypass module when the trust level equals or is below the trust threshold, wherein the authentication server attempts to authenticate the request using the one or more request parameters in relation to a resource access policy for the resource according to the stateless protocol; and
- wherein the authentication bypass module is operative to grant access to the resource at the resource server without sending the request to the authentication server when the trust level exceeds the trust threshold.

* * * * *